Oct. 19, 1937.    G. B. WILSON    2,096,367
LUBRICATING DEVICE
Filed May 27, 1933
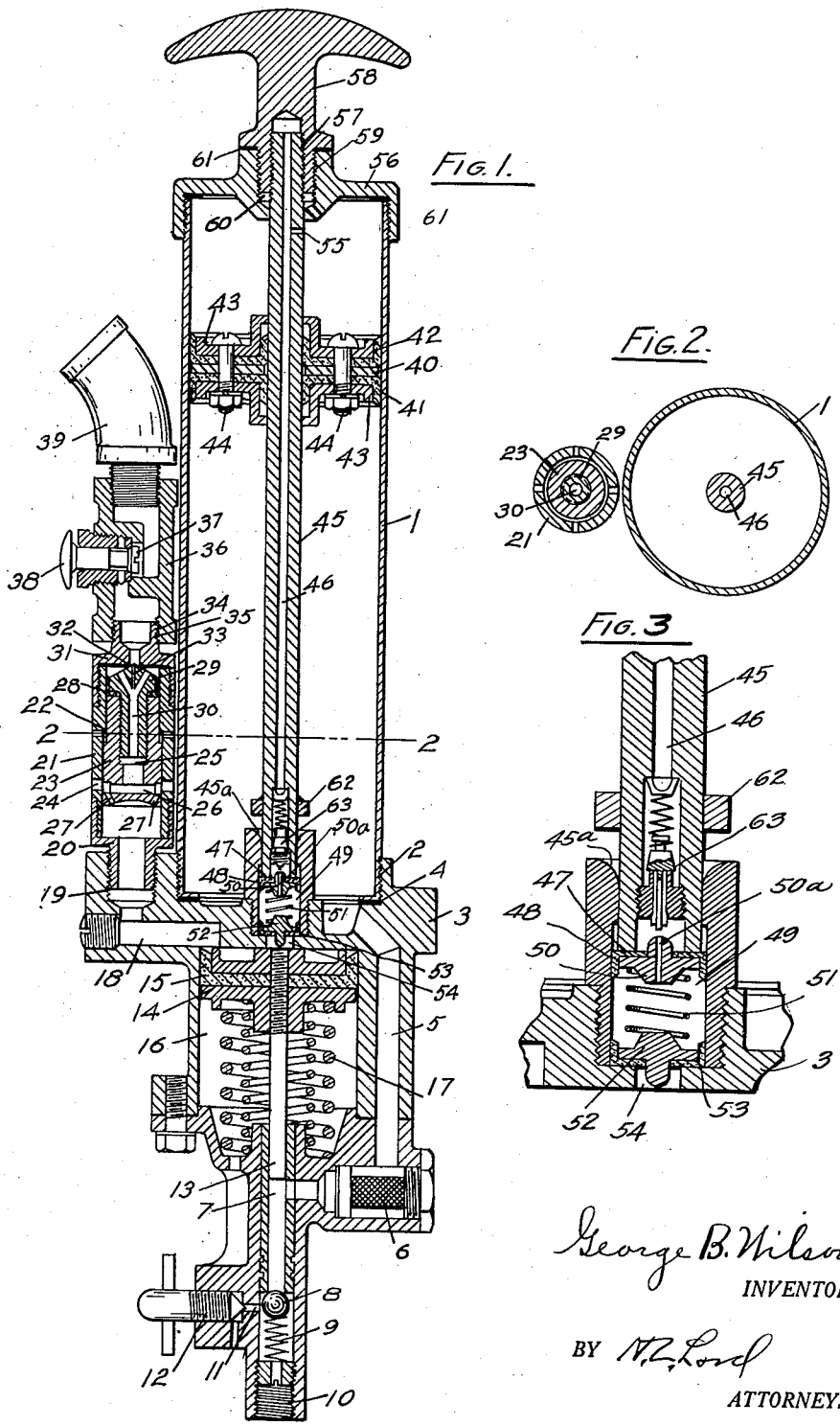

Patented Oct. 19, 1937

2,096,367

UNITED STATES PATENT OFFICE 2,096,367

LUBRICATING DEVICE

George B. Wilson, Erie, Pa.; Edward L. Palmer, Erie, Pa., guardian of said George B. Wilson, incompetent, assignor to a Holding Committee for Service Manufacturing Company, comprising Leonard F. Haag, Karl C. Eagley, and Leroy C. Erickson, all of Erie, Pa.

Application May 27, 1933, Serial No. 673,259

7 Claims. (Cl. 221—47.3)

The present invention is designed to improve lubricating devices, particularly lubricating devices used with relation to lubricator receptacles. Heretofore lubricating devices of this type have been provided with air-actuated pistons operating the pump piston so as to force a movement of lubricant under high pressure and valves have been provided for controlling the operation of the piston. In an application filed by Karl C. Eagley and me, June 29, 1932, Ser. No. 619,937 we have shown a pump of this type connected with a lubricant receptacle and have provided this lubricant receptacle with a plunger, or follower, forcing the lubricant into the pump. In this pump of our former application also we have carried a connection from the fluid supply line to the upper end of the receptacle so as to deliver air under pressure to the receptacle and thus exert pressure on the plunger to force a discharge of the lubricant to the pump. It is preferable in loading the lubricant receptacle to remove it from the pump body and load the receptacle from this end of the cylinder. The present invention is designed to simplify the structure so as to permit of the ready removal of the cylinder and at the same time simplify the connection leading from the air supply to the upper end of the receptacle. Features and details of the invention will appear from the specification and claims.

A preferred embodiment of the invention is illustrated in the accompanying drawings as follows:—

Fig. 1 shows a central section through the device.

Fig. 2 a section on the line 2—2 in Fig. 1.

Fig. 3 is an enlarged view in section of the valve chamber in the lower part of the lubricant receptacle.

I marks the lubricant receptacle. This has a screw-threaded end 2 which is screwed into a body 3, a gasket 4 sealing the joint. The lubricant is discharged from the receptacle through a passage 5 in the body, the lubricant passing a strainer 6 and being delivered to a reduced cylinder end 7 of the pump. A check valve 8 retards the flow from the pump, the valve being held yieldingly closed by a spring 9 and the body is provided with a fitting 10 by which it may be connected to a discharge conduit, or other means (not shown). The usual vent 11 is provided with a valve 12 which permits venting the discharge line, when desired.

The small end 13 of the pump piston operates in the reduced cylinder end 7 and the air-operated portion of a piston 14 provided with a cup 15 operates in an enlarged portion 16 of the cylinder. Springs 17 return the piston 14 after it has been forced forward by reason of the air pressure. Air is delivered to the cylinder through a passage 18 from a screw-threaded socket 19 in the body 3. A fitting 20 is screwed into the socket 19 and a valve chest 21 is screwed into the fitting 20. The valve chest is stepped at 22 being larger at the discharge end and a valve 23 is slidingly mounted in the chest and operates over an exhaust port 24. The valve has an axial opening 25 through it communicating with radial openings 26 and the radial openings lead to the end of the chest by openings 27. The upper end of the valve is provided with a cup 28 which is secured by a fitting 29, the fitting 29 having an opening 30 continuing the opening in the valve. A cap 31 closes the upper end of the valve chest. The fitting 29 terminates with a seating surface at its upper end which operates on a seat 32 in the cap. A minute opening 33 leads through the fitting 29 and provides an initial opening for the air. The cap 31 has a screw-threaded end 34 and a control valve body 36 has a similar screw thread 35 by means of which it is secured to the cap. It is provided with a valve head 37 operating from a thumb plate 38. Air is delivered through a connection 39, if desired.

The operation of this mechanism is similar to that of my former application. When the valve 37 is opened, air operating on the end of the valve moves it downwardly closing the exhaust ports 24 and admitting air through the passages to the upper end of the cylinder, the air operating on the piston 14 to operate the pump plunger 13, and thus effect a discharge of lubricant. As soon as the piston 14 reaches the limit of its stroke, pressure builds up back of it and this pressure leading back to the valve chest and operating on the discharge end of the valve forces the valve rearwardly so as to open the exhaust ports 24. When the air is exhausted to a sufficient extent the valve again moves forward and the operation is repeated.

A plunger 40 is arranged in the receptacle. This has the oppositely extending cups 41 and 42 and cup securing plates 43 connected by bolts 44. This plunger is slidingly mounted on a rod 45, the cups having a central opening forming a closure around the rod 45. The rod 45 has an opening 46 through it. The end 47 of the rod 45 seats on the back of a cup 48, the cup being arranged in a valve chamber 49. A fitting 50 is arranged in the cup and has an opening 50a extending through it. A spring 51 operates against the fitting 50 and against a similar fitting 52 arranged in a cup 53 faced in a reverse direction from the cup 48. The cup 53 closes an opening 54 to the cylinder 16. The rod 45 has a lateral opening 55 in the upper end of the receptacle.

When the air reaches the upper end of the cylinder and moves the piston 14 air is admitted through the opening 54 past the cup 52 and through the hollow fitting 50 into the opening 46 in the rod and delivered to the upper end of the receptacle, thus assuring pressure without attention of the operator on the upper end of the plunger. The upper end of the receptacle is provided with a cap 56 and the rod 45 extends through this cap and is provided with a screw threaded end 57 which is screwed into a handle 58. The handle has a screw-threaded end 59 which is screwed into a screw-threaded socket 60 in the cap. The lower end of the rod extends through the upper end of the chamber, the chamber having a flared opening 45a to receive it so that as the handle is screwed into place the lower end of the rod is carried through the opening 45a and seats on the back of the cup 50 forming a closure, the spring taking up any inaccuracies in the length of the rod. The handle seats on a gasket 61 and thus seals the upper end of the receptacle. The rod is provided with a stop shoulder 62 at its lower end which limits the downward movement of the plunger on the rod, and the opening 46 is provided with a check valve 63, this being the type of valve assembly ordinarily used with pneumatic tires. When the plunger reaches the bottom of the receptacle and it is desired to re-fill the receptacle, the receptacle is screwed out of the body, the handle screwed out of the cap. The open end of the receptacle is forced into the grease and the plunger is withdrawn by withdrawing the rod and the grease follows the plunger as it is retracted under the influence of exterior air pressure so that when the plunger reaches its upper position the receptacle is filled with grease and may then be returned to the body, the rod handle screwed back into the cap and the pump as a whole is ready for operation.

By arranging the air connection to the upper end of the plunger so that it permits this ready removal of the body for re-filling a much more convenient arrangement is provided and in as much as the operating rod is desirable for use in filling the receptacle in any event it performs the added function of forming the connection carrying air to the upper part of the receptacle.

What I claim as new is:—

1. In a lubricating device, the combination of a pump body having a pump motor cylinder; a pump motor piston in the cylinder; a pump having a plunger driven by the pump motor piston; a fluid pressure supply means leading to the cylinder; a valve controlling the supply means; a lubricant receptacle having a discharge connection leading to the pump; a follower in the receptacle; means forming a removable connection between the body and the receptacle; a valve chamber connected with the body; a hollow operating rod extending through the receptacle and the follower and having an opening to the receptacle above the follower and extending into the valve chamber; and spring actuated valves in the chamber checking a flow from the chamber and closing on the rod around the opening in the rod and preventing a back-flow from the chamber to the pump body.

2. In a lubricating device, the combination of a pump body having a pump motor cylinder; a pump motor piston in the cylinder; a pump having a plunger driven by the pump motor piston; a fluid pressure supply means leading to the cylinder; a valve controlling the supply means; a lubricant receptacle having a discharge connection leading to the pump; a follower in the receptacle; a cap on the receptacle having a screw-threaded opening; a hollow operating rod extending through the cap and having a screw-threaded end securing the rod to the cap and permitting its detachment and movement through the cap, said follower being slidingly mounted on the rod; a stop limiting the downward movement of the plunger on the rod and effecting a movement of the follower upon a withdrawal of the rod; means providing a removable connection between the receptacle and the body; and a valve mechanism providing a closure between the receptacle and the body, said mechanism comprising a check preventing a back-flow from the rod.

3. In a lubricating device, the combination of a body having a pump motor cylinder; a pump motor piston in the cylinder; a pump having a plunger driven by the pump motor piston; a fluid supply conduit to the cylinder; a valve carried by the body controlling the conduit; a receptacle removably mounted on the body, the body having a passage leading from the receptacle to the pump; a follower in the receptacle; and means leading from the body through the follower forming a passage from the fluid supply to the receptacle above the follower, said means being removable with the receptacle.

4. In a lubricating device, the combination of a pump body having a pump motor cylinder; a pump motor piston in the cylinder; a pump having a plunger driven by the pump motor piston; a lubricant receptacle detachably secured at its discharge end to the body and having a discharge connection leading to the pump; a fluid pressure supply means comprising passages leading to the cylinder and to the receptacle; a valve controlling the supply means; a follower in the receptacle; a hollow operating rod extending through the follower and detachably connected with the fluid supply at the body end of the receptacle, said rod being slidingly mounted in the follower and having a shoulder adjacent to its discharge end adapted to pick up the follower when the rod is withdrawn, said rod extending through the end of the receptacle opposite the body and having an opening leading to the receptacle at a point remote from the body; and a check valve in the connection leading through the rod.

5. In a lubricating device, the combination of a pump body having a pump motor cylinder; a pump motor piston in the cylinder; a pump having a plunger driven by the pump motor piston; a lubricant receptacle detachably secured at its discharge end to the body and having a discharge connection leading to the pump; a fluid pressure supply means comprising passages leading to the cylinder and to the receptacle; a valve controlling the suppy means; a follower in the receptacle; a hollow operating rod extending through the follower and detachably connected with the fluid supply at the body end of the receptacle, said rod being slidingly mounted in the follower and having a shoulder adjacent to its discharge end adapted to pick up the follower when the rod is withdrawn, said rod extending through the end of the receptacle opposite the body and having an opening leading to the receptacle at a point remote from the body; and a check valve closing a back-flow through the rod when the receptacle is removed.

6. In a lubricating device, the combination of a pump body having a pump motor cylinder; a pump motor piston in the cylinder; a pump having a plunger driven by the pump motor piston; a lubricant receptacle detachably secured at its discharge end to the body and having a discharge connection leading to the pump; a fluid pressure supply means comprising passages leading to the cylinder and to the receptacle; a valve controlling the supply means; a follower in the receptacle; a hollow operating rod extending through the follower and telescopically connected with the body and connected with the fluid supply, said rod being slidingly mounted in the follower and having a shoulder adjacent its discharge end adapted to pick up the follower when the rod is withdrawn, said rod extending through and having a screw-threaded connection with the end of the receptacle opposite the body; and a check valve in the connection leading through the rod.

7. In a lubricating device, the combination of a pump body having a pump motor cylinder; a pump motor piston in the cylinder; a pump having a plunger driven by the pump motor piston; a lubricant receptacle detachably secured at its discharge end to the body and having a discharge connection leading to the pump; a fluid pressure supply means comprising passages leading to the cylinder and to the receptacle; a valve controlling the supply means; a follower in the receptacle; a hollow operating rod extending through the follower and telescopically connected with the body and connected with the fluid supply, said rod being slidingly mounted in the follower and having a shoulder adjacent its discharge end adapted to pick up the follower when the rod is withdrawn, said rod extending through and having a screw-threaded connection with the end of the receptacle opposite the body; a check valve in the connection leading through the rod; and means sealing the body end of the rod when the rod is screwed into the end of the receptacle.

GEORGE B. WILSON.